United States Patent

Becker et al.

[11] Patent Number: 6,000,519
[45] Date of Patent: Dec. 14, 1999

[54] CENTRIFUGAL CLUTCH

[75] Inventors: Georg Becker, Schwaikheim; Hans-Georg Wiedmann, Backnang; Dieter Angstenberger, Leutenbach, all of Germany

[73] Assignee: Andreas Stihl AG & Co., Waiblingen, Germany

[21] Appl. No.: 09/081,293

[22] Filed: May 20, 1998

[30] Foreign Application Priority Data

May 24, 1997 [DE] Germany .............................. 197 21 747

[51] Int. Cl.⁶ ....................................................... F16D 43/04
[52] U.S. Cl. ........................................ 192/105 CD; 192/75
[58] Field of Search .............................. 192/105 CD, 75

[56] References Cited

U.S. PATENT DOCUMENTS

| | | | |
|---|---|---|---|
| 3,197,004 | 7/1965 | Salsbury | 192/105 CD |
| 3,208,571 | 9/1965 | Bochory | 192/105 CD |
| 3,224,541 | 12/1965 | Yamamoto | 192/105 CD |
| 3,552,904 | 1/1971 | De Lancey | 192/105 CD |
| 3,693,771 | 9/1972 | De Lancey | 192/105 CD |
| 4,106,605 | 8/1978 | Winchell . | |
| 4,192,412 | 3/1980 | Stoner | 192/105 CD |
| 4,226,320 | 10/1980 | St. John | 192/105 CD |

Primary Examiner—Rodney H. Bonck
Attorney, Agent, or Firm—Walter Ottesen

[57] ABSTRACT

The invention is directed to a centrifugal clutch having centrifugal weights wherein each weight has an arc-shaped clutch shoe and is pivotally mounted with a lever foot on a carrier disc on the drive end of the clutch. After reaching a specific rpm, the clutch shoes are pressed under the action of centrifugal force against the inner wall surface of a clutch drum for providing friction-tight torque transmission. The clutch drum surrounds the clutch shoes. The centrifugal clutch includes a carrier disc on which the centrifugal weights are pivotally mounted. A cover disc is held axially tight at the sides of the centrifugal weights which lie opposite the carrier disc. This cover disc radially covers the clutch shoes so that axial guide play is provided. In this way, wear of the clutch weights caused by operation is reduced especially in the bearing regions of the centrifugal weights.

13 Claims, 2 Drawing Sheets

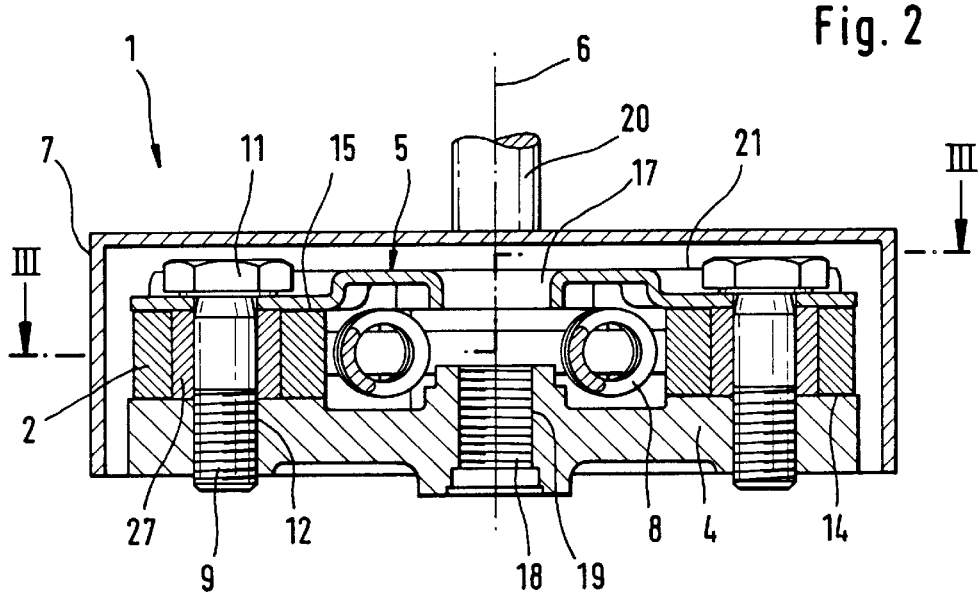
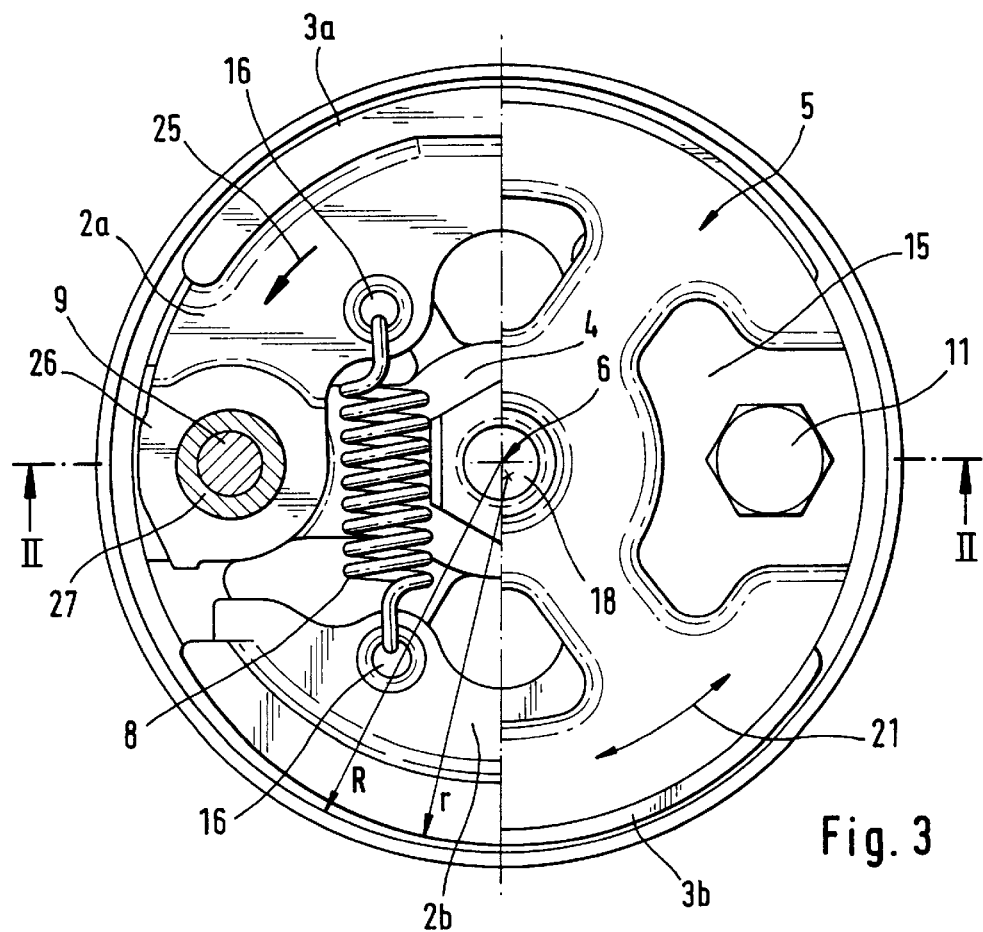

CENTRIFUGAL CLUTCH

BACKGROUND OF THE INVENTION

Centrifugal clutches are rpm-actuated clutches having radially movable centrifugal weights mounted on the drive end. Under the influence of the centrifugal force, the centrifugal weights transmit a specific torque friction tight to the output end of the centrifugal clutch with the required contact force. After reaching a limit rpm, an automatic coupling takes place so that a load free startup of the drive motors is possible. Centrifugal clutches are advantageous for rapidly running drive motors such as internal combustion engines and make possible a high starting torque for accelerating large masses in relationship to the drive power so that the drive motor does not have to be designed for short-term high starting power. Furthermore, the centrifugal clutches protect the drive motors from overload and decouple the load in the low rpm range, for example, in idle, for example, in the case where the centrifugal clutch is used in a work apparatus, such as a motor-driven chain saw. Here, the load would be the saw chain.

U.S. Pat. No. 4,106,605 discloses a centrifugal clutch wherein the centrifugal weights each have an arcuately-shaped clutch shoe and are pivotally held on a carrier disc at the output end of the centrifugal clutch. The pivot journalling of the centrifugal weights is achieved via respective bearing bolts which are mounted on the carrier disc at equal spacings from each other so as to be parallel to a rotational axis of the carrier disc. When the carrier disc is driven in rotation, the centrifugal weights pivot under the action of the centrifugal force about their respective pivot bolts and the arcuately-shaped pole shoes carry out a radial movement.

At the output end of the centrifugal clutch, a clutch drum is mounted coaxially to the carrier disc and surrounds the clutch shoes. The clutch shoes are radially movable by the centrifugal force against the return force of a coiled tension spring and can be pressed against the inner wall surface of the clutch drum. The centrifugal force exceeds the return force of the tension spring above a specific rpm range by an amount which corresponds to the application force of the clutch shoes required for the friction-tight entrainment of the clutch drum.

Intense wear occurs during operation of the known centrifugal clutch especially for frequent coupling operations. The material wear in the bearing area of the centrifugal weights leads to deteriorated operation of the centrifugal clutch.

SUMMARY OF THE INVENTION

It is an object of the invention to provide a centrifugal clutch which is so configured that the wear of the centrifugal clutch caused by operation is reduced.

The centrifugal clutch of the invention has a drive end where the clutch is driven and an output end. The centrifugal clutch includes: a carrier disc defining a rotational axis and being adapted to be driven in rotation by a power source; at least two centrifugal weights to which respective centrifugal forces are applied when the carrier disc rotates; each of the centrifugal weights having a lever foot and an arcuately shaped clutch shoe; a clutch drum having an inner wall surface lying opposite the clutch shoes and being arranged at the output end coaxially to the carrier disc; at least two bearing bolts parallel to the rotational axis for pivotally holding corresponding ones of the centrifugal weights on the carrier disc at the lever feet, respectively, so that each of the centrifugal weights can move between a pivoted-in position whereat the clutch shoe is disengaged from the clutch drum and a pivoted-out position wherein the clutch shoe presses against the inner wall surface of the clutch drum; means for applying a resilient restoring force to the centrifugal weights to bias the centrifugal weights into the pivoted-in position; each of the centrifugal weights being mounted on the carrier disc so as to cause the clutch shoe thereof to move radially into contact engagement with the clutch drum under the action of the centrifugal force when the restoring force of the resilient means is overcome by the centrifugal force; and, a cover disc disposed opposite the carrier disc and being axially fixedly mounted and extending radially to cover the clutch shoes with axial guide play.

The cover disc is held axially on the side of each of the clutch weights which lies opposite the carrier disc. On the inner side of this cover disc, the clutch shoes are axially guided during the pivot movement of the centrifugal weights. Because of the narrow axial guide play between the clutch shoes and the cover disc, axial movements are avoided while permitting the free pivot movement of the centrifugal weights. These axial movements can otherwise lead to damaging loading at the lever feet of the centrifugal weights in the form of a bending torque in the axial direction of the bearing bolts. The above cover disc radially covers the clutch shoes. The clutch shoes are guided over their entire arcuate length on the carrier disc and can be brought into contact engagement on the inner wall surface of the clutch drum substantially free of transverse forces.

Advantageously, the bearing bolts extend through the cover disc and the cover disc lies between a bolt head and the lever foot. The axial guidance of the clutch shoes during the pivot movement of the centrifugal weights is facilitated when the carrier disc radially covers the clutch shoes with a slight axial guide play. The centrifugal weights are freely movable in a compact clutch assembly having high strength between the defined axially spaced discs and are precisely axially guided at both sides.

BRIEF DESCRIPTION OF THE DRAWINGS

The invention will now be described with reference to the drawings wherein:

FIG. 2 shows a longitudinal section of the centrifugal clutch taken along line II—II of FIG. 3; and, FIG. 3 shows a detail view, in section, of the centrifugal clutch taken along line III—III of FIG. 2.

DESCRIPTION OF THE PREFERRED EMBODIMENTS OF THE INVENTION

Figure 1:
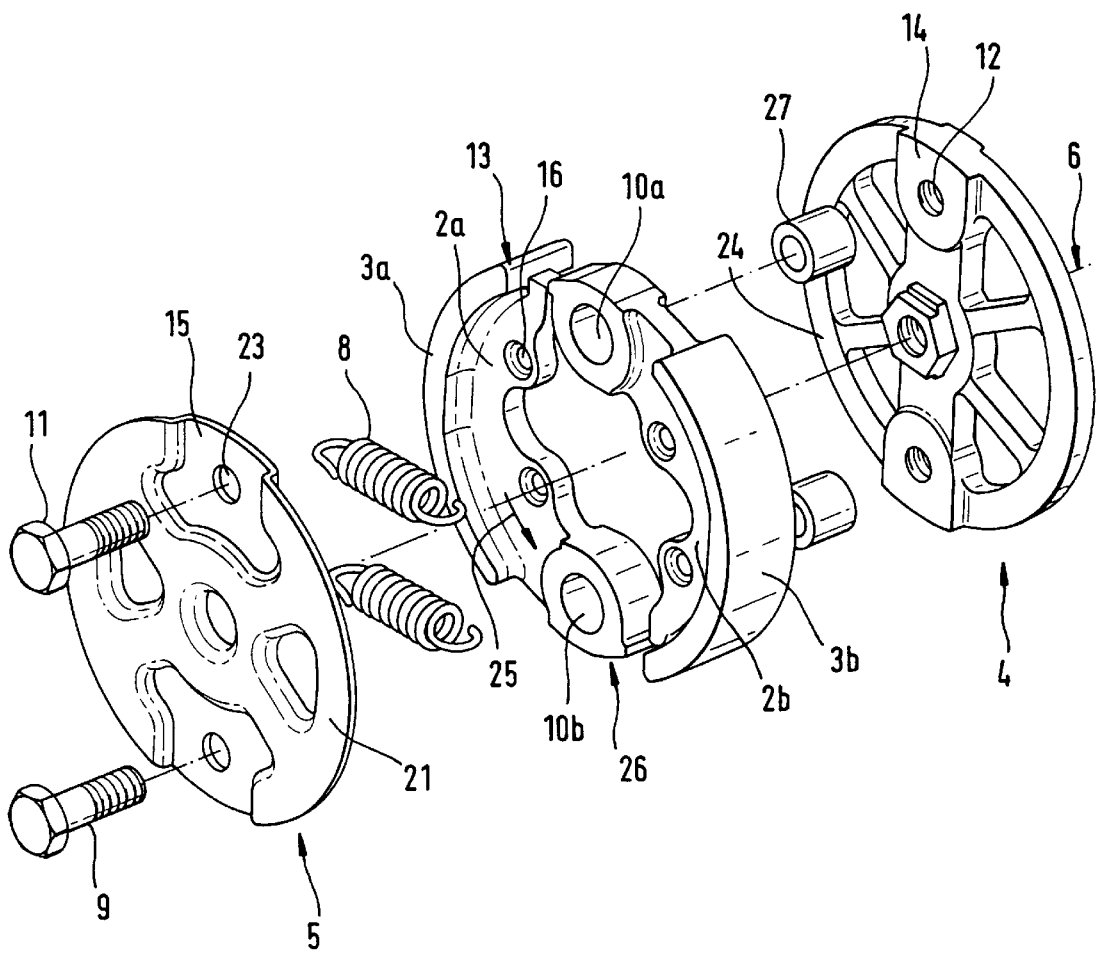
FIG. 1 is an exploded view showing the essential components of the drive end of a centrifugal clutch according to an embodiment of the invention.

FIG. 1 shows the components of the drive end of a centrifugal clutch which has two centrifugal weights (2a, 2b) having respective clutch shoes (3a, 3b). The clutch shoes (3a, 3b) each have a shape corresponding to a circular arc. The centrifugal weights (2a, 2b) are each pivotally held on a carrier disc 4 with a lever foot 26. The carrier disc 4 can be driven in rotation about a rotational axis 6 by a drive source (not shown). The centrifugal weights (2a, 2b) each have the same configuration and are mounted on the carrier disc 4 so as to be point symmetrical to the rotational axis 6 and to be equally spaced from each other. The pivotal journalling and attachment of the centrifugal weights (2a, 2b) on the carrier disc 4 is provided by bearing bolts 9. The bearing bolts 9 lie diametrically opposite each other and are attached to the carrier disc 4 in parallel to the rotational axis 6 and extend through corresponding bearing eyes (10a, 10b) in the lever foot 26 of the centrifugal weights (2a, 2b).

For attachment to the carrier disc 4, the bearing bolts 9 can, for example, be provided with a threaded end portion and be threadably engaged in corresponding threaded bores 12 in the carrier disc 4 for pivotally attaching the centrifugal weights (2a, 2b). Spacer means 27 shown in FIG. 2 can be provided to ensure that the centrifugal weights (2a, 2b) are held axially secure on the carrier disc 4 and to thereby ensure free pivotal movement. The spacer means 27 are in the bearing eyes (10a, 10b) and slightly exceed the axial length thereof. In this way, a tightening of the axial bolt 9 to secure the cover disc 5 is possible without a clamping action of the bolt heads 11 on the lever feet 26.

The clutch shoes (3a, 3b) are moved outwardly by the pivot movement of the centrifugal weights (2a, 2b) because of the action of centrifugal force when the carrier disc 4 is set into rotational movement. The centrifugal weights (2a, 2b) are held in their in-pivot position by the tension springs 8 at low rpms where the centrifugal force is low. The outward pivot movement of the centrifugal weights (2a, 2b) only begins when the centrifugal force, which is dependent upon the rpm, overcomes the return force of the tension springs 8. One tension spring 8 is provided for each centrifugal weight.

In the embodiment shown, the tension spring 8 is a helical spring having a hook at each end thereof. The points of application of the tension springs 8 on the centrifugal weights (2a, 2b) lie, in each case, close to the free end 13 of the centrifugal weight on the one hand and close to the lever foot 26 of the next-adjacent centrifugal weight. The centrifugal weights (2a, 2b) are provided with hook openings 16 in the region of the attachment points of the tension springs 8 and the hooks at the ends of the tension springs 8 extend through the respective openings 16. The tension springs 8 are mounted in such a manner that they extend between their attachment points to the centrifugal weights at a spacing to the rotational axis 6. The carrier disc 4 can therefore be pushed far onto the end section of a drive shaft whereby a transmission of the drive torque is ensured. The end section of the drive shaft can be guided far into the intermediate space of the centrifugal weights (2a, 2b) and their respective tension springs 8.

A cover disc 5 is axially secured coaxially to the carrier disc 4 on the end of the centrifugal weights (2a, 2b) lying opposite the carrier disc 4. The cover disc 5 covers the clutch shoes (3a, 3b) radially with a slight axial guide play. The cover disc 5 is provided with diametrically opposite lying bores 23 which can be brought into coincidence with the bearing eyes (10a, 10b) of the centrifugal weights. The bearing bolts 9 can pass through the cover disc 5 for attaching the cover disc 5 to the carrier disc 4. The cover disc 5 is held between the bolt head 11 of the bearing bolt 9 and the lever foot 26 of the centrifugal weights (2a, 2b).

The clutch shoes (3a, 3b) are axially guided with precision during the pivot movement of the centrifugal weights (2a, 2b) by the guide section 21 of the cover disc 5 because of the radial superposition of the clutch shoes (3a, 3b) with axial guide play. The carrier disc 4 likewise covers over the clutch shoes (3a, 3b) with an annularly-shaped periphery with little axial play so that the clutch shoes (3a, 3b) are precisely guided between the guide section 21 of the cover disc 5 and the inner-lying guide path 24 of the carrier disc 4. Bearing loads of the centrifugal weights (2a, 2b), which would otherwise, as a consequence of the axial displacement during outward pivotal movement, lead to a rapid wear, are thereby precluded.

The centrifugal weights (2a, 2b) each have their greatest axial width at the clutch shoes (3a, 3b) whereby an optimal friction-tight transmission of torque is ensured.

Contact surfaces (14, 15) are formed on the carrier disc 4 and the cover disc 5, respectively. The contact surfaces (14, 15) are raised portions extending above the disc plane in each case. In the assembled condition, the carrier disc 4 with its contact surface 14 and the cover disc 5 with its contact surface 15 are clamped toward each other by means of the bearing bolts 9. The spacers 27 on the lever foot 26 ensure the pivotability of the centrifugal weights (2a, 2b).

The cover disc 5 is a sheet metal part having a thin wall thickness. This sheet metal part can be provided with the raised contact surface 15 via suitable metal working methods such as drawing. The cover disc 5 can therefore be produced at favorable cost.

The clutch conventionally runs in the direction of arrow 25 with the coupling shoes (3a, 3b) following. After reaching a specific rpm, the out-pivoted clutch shoes (3a, 3b) contact engage automatically and slowly friction tight against a clutch drum 7. The transmitted torque increases approximately quadratically with the drive rpm. The guidance of the clutch shoes (3a, 3b) via the discs (4, 5) reduces the bearing loads of the centrifugal weights (2a, 2b) to a minimum whereby, with the high strength of the compact configuration (which is achieved by the arrangement of the cover disc 5), even an operation of the centrifugal clutch in the opposite rotational direction with advance-running clutch shoes to increase the transmittable torque is made possible.

FIG. 2 shows a longitudinal section of an assembled centrifugal clutch 1. The centrifugal weights 2 are pivotably held between the cover disc 5 and the carrier disc 4 by respective bearing bolts 9. The contact surfaces (14, 15) of the carrier disc 4 and the cover disc 5, respectively, are clamped between the bolt head 11 and the threaded end portion of the bearing bolts at the end faces of a spacer sleeve 27. The spacer sleeve 27 is seated in the bearing eye of the centrifugal weight 2 with a slight excess and ensures the free pivotal movement of the centrifugal weights 2.

The drive end of the centrifugal clutch 1 is seated in a rotational-symmetrical clutch drum 7 and the output end of the clutch. The centrifugal weights 2 pivot outwardly during rotation of the carrier disc 4 about the rotational axis 6 under the effect of the centrifugal force and are pressed against the inner wall surface 30 of the clutch drum 7 after reaching a specific rpm. The clutch drum carries an output element 20 centrally on its outer lying end face which, after the engagement of the clutch shoes on the inner wall surface 30 of the clutch drum 7, is put into rotational movement about the rotational axis 6. The output element 20 can be a shaft or a pinion or the like depending upon the kind of work machine to be driven, for example, a work tool.

The carrier disc 4 includes a hub 18 which is provided with a thread 19 for attaching the carrier disc to a drive shaft of a motor. The hub 18 is formed so as to extend through the carrier disc 4 and the motor shaft can therefore be introduced into the interior of the centrifugal clutch 1 to achieve a compact configuration. The end portion of the motor shaft projects between the springs 8 of the clutch weights 2 and can be fixed in the hub via corresponding holding elements. The cover disc 5 is provided with a central opening 17 which has a diameter greater than the hub 18 of the carrier disc 4. The hub 18 lies superposed. The opening 17 in the cover disc 5 can be produced in a simple manner by collar forming with a widened diameter and facilitates a simple access to the hub 18, that is, to the securing elements on the shaft end portion of the motor shaft in the assembled state of the centrifugal clutch 1.

FIG. 3 is a section view of the centrifugal clutch 1 taken along line III—III of FIG. 2. In FIG. 3, half of the illustrated clutch is a plan view as viewed toward the drive end of the centrifugal clutch 1 viewed from the cover disc 5. From FIG. 3, it can be seen that the center point of the arc radius r of the clutch shoes (3a, 3b) lies spaced from the rotational axis 6. With this configuration of the centrifugal clutch, the situation is achieved that the clutch shoes (3a, 3b) are pressed against the inner wall surface of the clutch drum 7 with a pressure point lying approximately at the center of the arc length of the clutch shoes (3a, 3b) when the centrifugal weights (2a, 2b) pivot outwardly. In this way, and during operation of the clutch with the rotational direction shown by arrow 25 and with lagging centrifugal weights (2a, 2b), manufacturing tolerances of the clutch are compensated and a uniform torque transmission by the centrifugal weights (2a, 2b) is made possible. Furthermore, an operation in the rotational direction opposite to arrow 25 is made possible by the eccentric arrangement of the arc radius r of the clutch shoes (3a, 3b) because the center pressure point of the clutch shoes (3a, 3b) reduces the load of the clutch drum and avoids destruction of the clutch drum caused by wear. The wear resistance of the centrifugal clutch while simultaneously increasing the power capability is facilitated by the configuration of the clutch shoes (3a, 3b) with an arc radius r which is less than the radius R of the clutch drum 7.

In the embodiment shown, the centrifugal clutch 1 includes two centrifugal weights (2a, 2b) having clutch shoes (3a, 3b) which each extend over an arcuate angle of approximately 120° to 140°. However, it can also be advantageous to provide three or more centrifugal weights equipped with clutch shoes. These centrifugal weights are held on the carrier disc spaced equally one from the other so that the drive end of the clutch is weighted and rotates with an advantageous moment of inertia.

The centrifugal clutch of the invention is especially suited for use with work apparatus having a rapidly running internal combustion engine because of its reduced wear even for frequent clutch operations because of the precise guidance of the centrifugal weights. The clutch wear and therefore the operating cost are greatly reduced in handheld portable work apparatus wherein it is necessary to frequently decouple a tool after ending a work operation or reducing the drive power such as in chain saws or the like.

It is understood that the foregoing description is that of the preferred embodiments of the invention and that various changes and modifications may be made thereto without departing from the spirit and scope of the invention as defined in the appended claims.

What is claimed is:

1. A centrifugal clutch having a drive end where said clutch is driven and an output end, the centrifugal clutch comprising:

a carrier disc defining a rotational axis and being adapted to be driven in rotation by a power source;

at least two centrifugal weights to which respective centrifugal forces are applied when said carrier disc rotates;

each of said centrifugal weights having a lever foot and an arcuately shaped clutch shoe;

a clutch drum having an inner wall surface lying opposite said clutch shoes and being arranged at said output end coaxially to said carrier disc;

at least two bearing bolts parallel to said rotational axis for pivotally holding corresponding ones of said centrifugal weights on said carrier disc at said lever feet, respectively, so that each of said centrifugal weights can move between a pivoted-in position whereat the clutch shoe is disengaged from said clutch drum and a pivoted-out position wherein the clutch shoe presses against said inner wall surface of said clutch drum;

means for applying a resilient restoring force to said centrifugal weights to bias said centrifugal weights into the pivoted-in position;

each of said centrifugal weights being mounted on said carrier disc so as to cause the clutch shoe thereof to move radially into contact engagement with said clutch drum under the action of the centrifugal force when the restoring force of said resilient means is overcome by the centrifugal force; and, a cover disc disposed opposite said carrier disc and being axially fixedly mounted and extending radially to cover said clutch shoes with axial guide play.

2. The centrifugal clutch of claim 1, said carrier disc having first and second openings and said bearing bolts passing through said openings, respectively; said bolts having respective bolt heads; and, said cover disc being between said bolt heads and corresponding ones of said lever feet so as to be in contact therewith.

3. The centrifugal clutch of claim 2, said carrier disc radially covering said clutch shoes with axial guide play.

4. The centrifugal clutch of claim 1, said cover disc and carrier disc defining respective planes; each of said centrifugal weights having its widest dimension measured in the direction of said rotational axis at the clutch shoe thereof; and, each of said cover disc and said carrier disc having raised portions formed so as to be elevated above the corresponding plane thereof and so as to define respective contact surfaces.

5. The centrifugal clutch of claim 1, wherein said cover disc is made of thin sheet metal.

6. The centrifugal clutch of claim 1, said resilient means comprising two springs corresponding to said centrifugal weights, respectively; and, said springs being spaced from said rotational axis.

7. The centrifugal clutch of claim 6, each of said springs having a first end connected to the lever foot of one of said centrifugal weights and a second end connected to the free end of the other one of said centrifugal weights.

8. The centrifugal clutch of claim 1, said centrifugal weights being only two in number.

9. The centrifugal clutch of claim 1, said carrier disc having a hub formed thereon; and, said cover disc having a central opening having a diameter corresponding at least to the diameter of said hub.

10. The centrifugal clutch of claim 1, each of said clutch shoes having an arcuate surface defining an arc radius (r); and, said arc radius (r) having a center offset from said rotational axis.

11. The centrifugal clutch of claim 10, said clutch drum having a drum radius (R) measured from said rotational axis; and, said drum radius (R) being greater than said arc radius (r).

12. The centrifugal clutch of claim 1, said cover disc being axially fixedly mounted so as to rotate with said carrier disc; and, said cover disc and said carrier disc conjointly defining a gap therebetween for accommodating said centrifugal weights therein with said axial play.

13. The centrifugal clutch of claim 1, wherein said cover disc covers said clutch shoes so as to guide said clutch shoes during the movement thereof between said pivoted-in and pivoted-out positions to avoid unwanted axial movement of said centrifugal weights while permitting a free pivot movement of said centrifugal weights whereby a loading at the lever feet of said centrifugal weights in the form of a bending torque in the direction of said axis is avoided.

* * * * *

UNITED STATES PATENT AND TRADEMARK OFFICE
CERTIFICATE OF CORRECTION

PATENT NO. : 6,000,519
DATED : December 14, 1999
INVENTOR(S) : Georg Becker, Hans-Georg Wiedmann and Dieter Angstenberger It is certified that error appears in the above-identified patent and that said Letters Patent is hereby corrected as shown below:

```
     In column 4, line 41:  delete "and" and substitute
-- on -- therefor.
```

Signed and Sealed this

Ninth Day of January, 2001

Attest:

Q. TODD DICKINSON

*Attesting Officer*        *Commissioner of Patents and Trademarks*